United States Patent
Chen

(10) Patent No.: US 8,890,471 B2
(45) Date of Patent: Nov. 18, 2014

(54) WIRELESS CHARGING DEVICE

(75) Inventor: Chih-Hung Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 412 days.

(21) Appl. No.: 13/479,013

(22) Filed: May 23, 2012

(65) Prior Publication Data

US 2013/0257361 A1 Oct. 3, 2013

(30) Foreign Application Priority Data

Mar. 30, 2012 (TW) ............................. 101111262 A

(51) Int. Cl.
H02J 7/00 (2006.01)
(52) U.S. Cl.
USPC .......................................................... 320/108
(58) Field of Classification Search
USPC .......................................................... 320/108
See application file for complete search history.

(56) References Cited

U.S. PATENT DOCUMENTS

2009/0096413 A1* 4/2009 Partovi et al. ................. 320/108
2011/0006611 A1* 1/2011 Baarman et al. ............. 307/104

* cited by examiner

*Primary Examiner* — Jack Chiang
*Assistant Examiner* — Brandon Bowers
(74) *Attorney, Agent, or Firm* — Kirton McConkie; Evan R. Witt

(57) ABSTRACT

A wireless charging device includes a casing, a carrying member, and a first coil assembly. The casing includes a receiving space, an entrance side, and a supporting part. The carrying member includes a carrying plate, a first elastic structure, and a second elastic structure. The supporting part is disposed within the receiving space. The carrying member is located over the supporting part. The first coil assembly is fixed on the carrying plate. When the entrance side of the casing is fixed on a first surface of an object, the supporting part is presses against the first elastic structure and the second elastic structure, allowing the first elastic structure and the second elastic structure to be pushed by the first surface of the object and subject to deformation. Consequently, a balanced supporting force is generated to maintain a specified distance between the first coil assembly and the first surface of the object.

10 Claims, 5 Drawing Sheets

WIRELESS CHARGING DEVICE

FIELD OF THE INVENTION

The present invention relates to a wireless charging device, and more particularly to a wireless charging device for an electronic apparatus.

BACKGROUND OF THE INVENTION

For providing sufficient electric power to an electronic apparatus such as a mobile phone or a notebook computer, the electronic apparatus may be electrically connected to a power socket through a transmission cable and a plug or the electronic apparatus may be electrically connected to a computer in order to acquire the electric power. Since the conventional electronic apparatus can only be charged by a wired transmission technology through the transmission cable and the plug, it is inconvenient to use and carry the conventional electronic apparatus, the transmission cable and the plug.

For solving the above drawbacks, a variety of wireless charging devices have been disclosed. When an electronic apparatus is placed on a surface of the wireless charging device, the wireless charging device may transfer electric energy to the electronic apparatus in order to charge the electronic apparatus in a wireless transmission manner. During the process of transferring the electric power from the wireless charging device to the electronic apparatus, the coil assembly of the wireless charging device and the coil assembly of the electronic apparatus should be aligned with each other. Moreover, the distance between the coil assembly of the wireless charging device and the coil assembly of the electronic apparatus has a large influence on the wireless charging performance. That is, if the distance is too long or too short, the wireless charging performance is deteriorated or even the wireless charging operation fails to be normally performed. Moreover, if the wireless charging device is employed in a moving transport tool, a furniture product or any other place prone to vibration, the wireless charging device is easily shifted or damaged. Under this circumstance, the wireless charging performance of the wireless charging device is deteriorated. In other words, it is important to reduce the adverse influence from vibration.

Hereinafter, the structure of a conventional wireless charging device will be illustrated with reference to FIGS. 1 and 2. FIG. 1 is a schematic perspective view illustrating a conventional wireless charging device. FIG. 2 is a schematic perspective view illustrating the inner structure of a conventional wireless charging device.

As shown in FIGS. 1 and 2, the wireless charging device 1 comprises a casing 11, a power circuit 12, a holder 13, four rollers 14, and a first coil assembly 15. The casing 11 comprises an upper cover 11a and a base member 11b. The upper cover 11a comprises a charging platform 11aa.

The holder 13 is disposed within the base member 11b. The four rollers 14 are located at four corners of the holder 13, respectively. The first coil assembly 15 is disposed on the holder 13.

Hereinafter, the operations of the conventional wireless charging device will be illustrated with reference to FIGS. 1 and 2. When an electronic apparatus with a second coil assembly is placed on the charging platform 11aa, the first coil assembly 15 and the second coil assembly are attracted by and aligned with each other. As the electronic apparatus moves, the first coil assembly 15 is synchronously moved with the second coil assembly through the four rollers 14.

After the wireless charging device 1 is connected with a power source, the power circuit 12 may transfer electric energy from the power source to the first coil assembly 15. When an electric current flows through the first coil assembly 15, a magnetic field is generated. Due to the magnetic field generated by the first coil assembly 15, the second coil assembly generates another electric current to charge the electronic apparatus.

However, in a case that the wireless charging device 1 is operated in an object prone to vibration (e.g. within a vehicle), some drawbacks may occur. For example, since the wireless charging device 1 has no mechanism for maintaining the distance between the first coil assembly 15 and the charging platform 11aa and absorbing the vibration energy from the vehicle body, the first coil assembly 15 may be shaken up and down within the wireless charging device 1 during the vehicle is driven by the user. Under this circumstance, the wireless charging performance is adversely affected. Moreover, if the vibration is too serious, the wireless charging device 1 is possibly damaged.

Therefore, there is a need of providing an improved wireless charging device in order to eliminate the above drawbacks.

SUMMARY OF THE INVENTION

The present invention provides a wireless charging device with a mechanism for absorbing the vibration energy and maintaining the position of the first coil assembly.

In accordance with an aspect of the present invention, there is provided a wireless charging device. The wireless charging device includes a casing, a carrying member, and a first coil assembly. The casing includes a receiving space, a supporting part, and an entrance side. The supporting part is disposed within the receiving space. The carrying member is disposed within the receiving space and located over the supporting part. The carrying member includes a carrying plate, a first elastic structure, and a second elastic structure. The first elastic structure is located at a first side of the carrying plate, and includes a first connecting part, a first elastic piece and a second elastic piece. The first connecting part is extended from the first side of the carrying plate and contacted with the supporting part. The first elastic piece is extended from a first end of the first connecting part and has a distal end protruded outside the receiving space. The second elastic piece is extended from a second end of the first connecting part and has a distal end protruded outside the receiving space. The second elastic structure is located at a second side of the carrying plate, and includes a second connecting part, a third elastic piece and a fourth elastic piece. The second connecting part is extended from the second side of the carrying plate and contacted with the supporting part. The third elastic piece is extended from a first end of the second connecting part and has a distal end protruded outside the receiving space. The fourth elastic piece is extended from a second end of the third elastic piece and has a distal end protruded outside the receiving space. The first coil assembly is fixed on a top surface of the carrying plate. When the entrance side of the casing is fixed on a first surface of an object, the supporting part presses against the first connecting part of the first elastic structure and the second connecting part of the second elastic structure, allowing the first elastic piece, the second elastic piece, the third elastic piece and the fourth elastic piece to be pushed by the first surface of the object and subject to deformation, so that a balanced supporting force is generated to maintain a specified distance between the first coil assembly and the first surface of the object.

In an embodiment, when an electronic apparatus with a second coil assembly is placed on a second surface of the object, the electronic apparatus is charged by the second coil assembly.

In an embodiment, the wireless charging device further includes a circuit board, wherein the circuit board is fixed on a bottom surface of the carrying plate.

In an embodiment, the wireless charging device further includes a connector, wherein the connector is fixed on the circuit board.

In an embodiment, the casing further comprises a notch, and the connector is exposed to the notch to be connected with a power source.

In an embodiment, the power source provides electric energy to the first coil assembly through the circuit board, so that the first coil assembly generates a magnetic field.

In an embodiment, the second coil assembly is influenced by the magnetic field, so that the second coil assembly generates an electric current.

In an embodiment, the supporting part includes two posts, which are protruded from an inner surface of the receiving space.

In an embodiment, the object is a moving transport tool or a furniture product.

In an embodiment, the carrying member is made of metallic material.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks encountered from the prior art, the present invention provides a wireless charging device.

Figure 1:
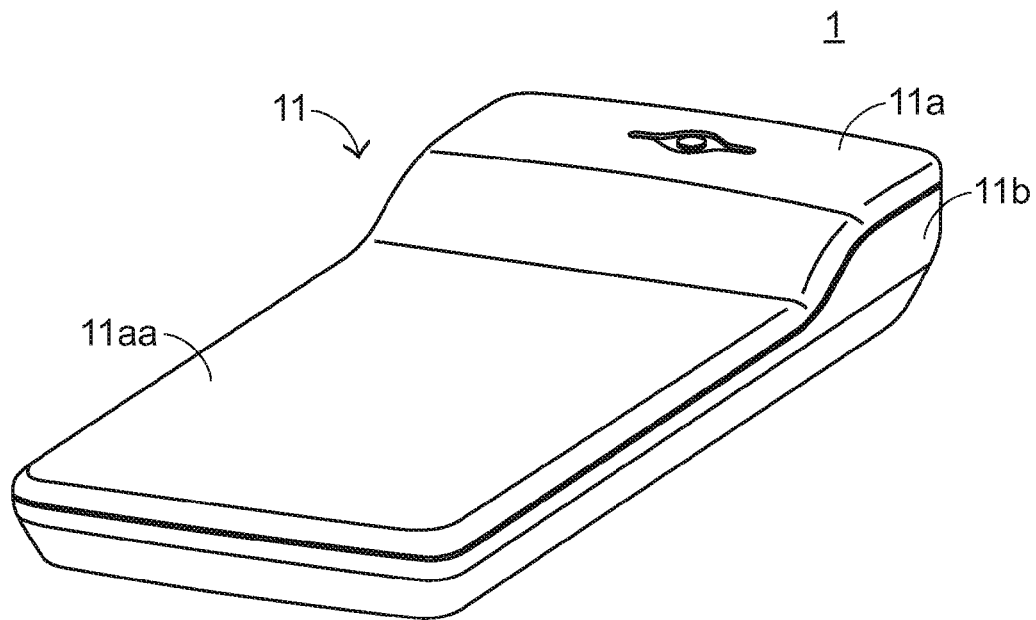
FIG. 1 is a schematic perspective view illustrating a conventional wireless charging device.
Figure 2:
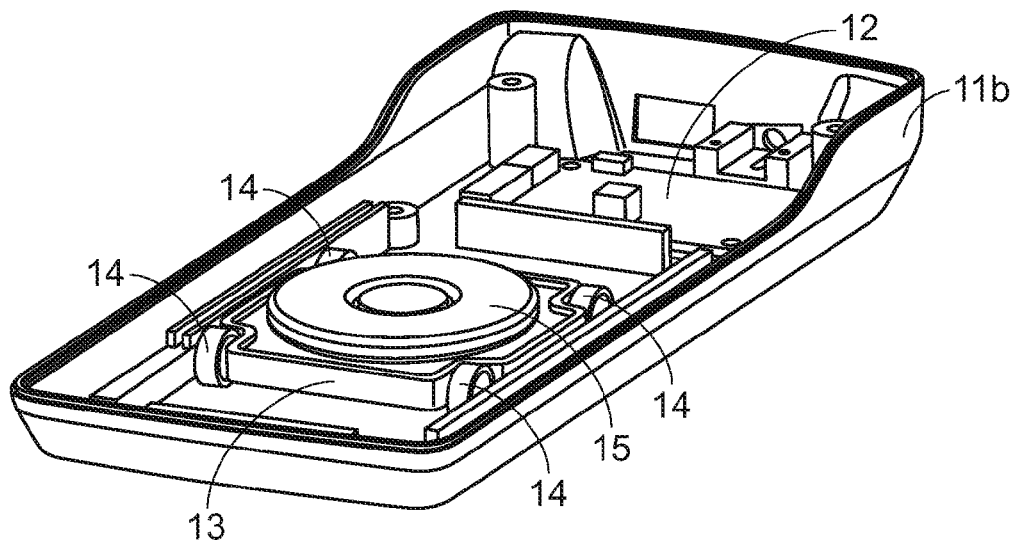
FIG. 2 is a schematic perspective view illustrating the inner structure of a conventional wireless charging device.
Figure 3:
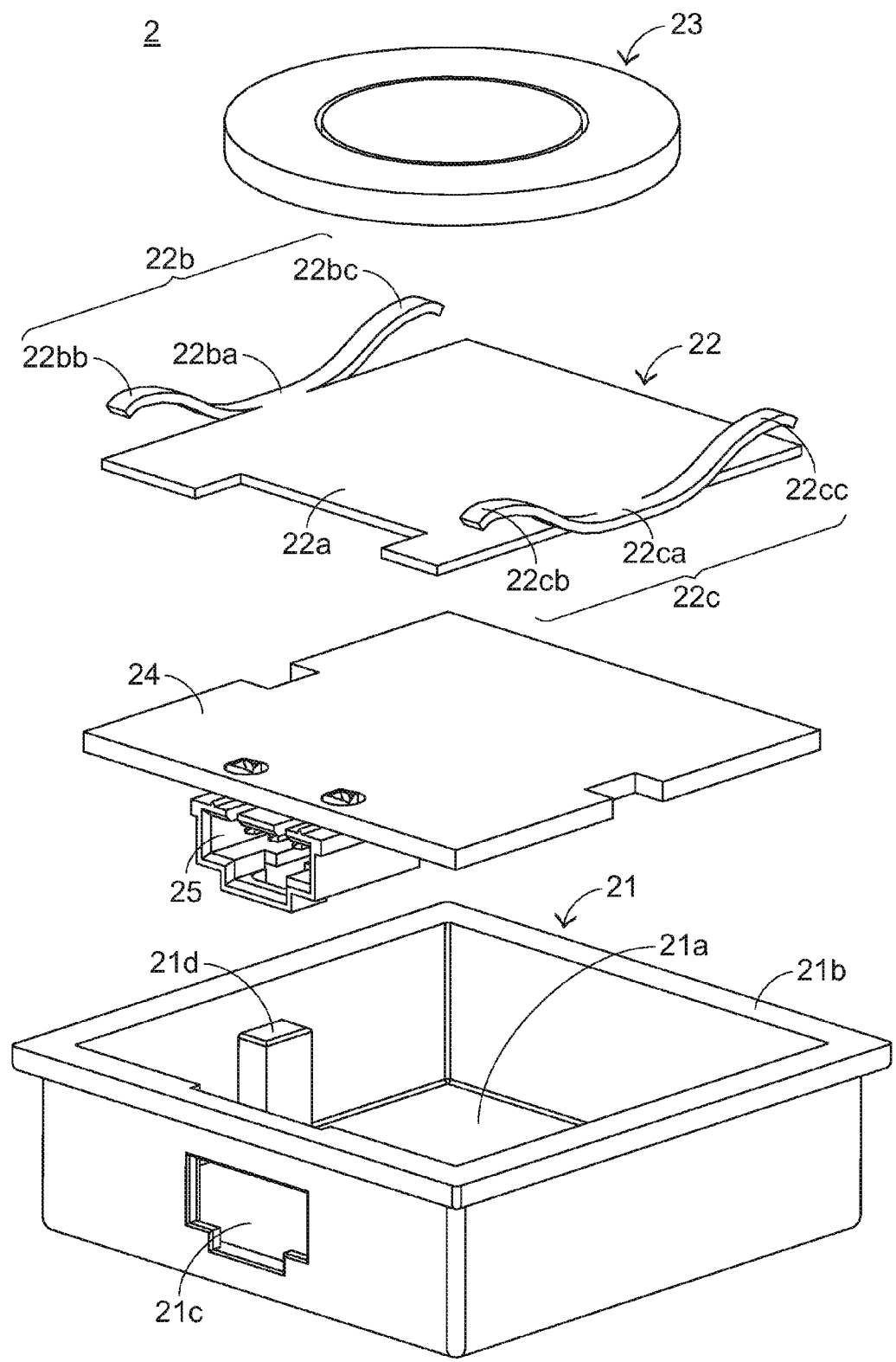
FIG. 3 is a schematic exploded view illustrating a wireless charging device according to an embodiment of the present invention and taken along a first viewpoint.
Figure 4:
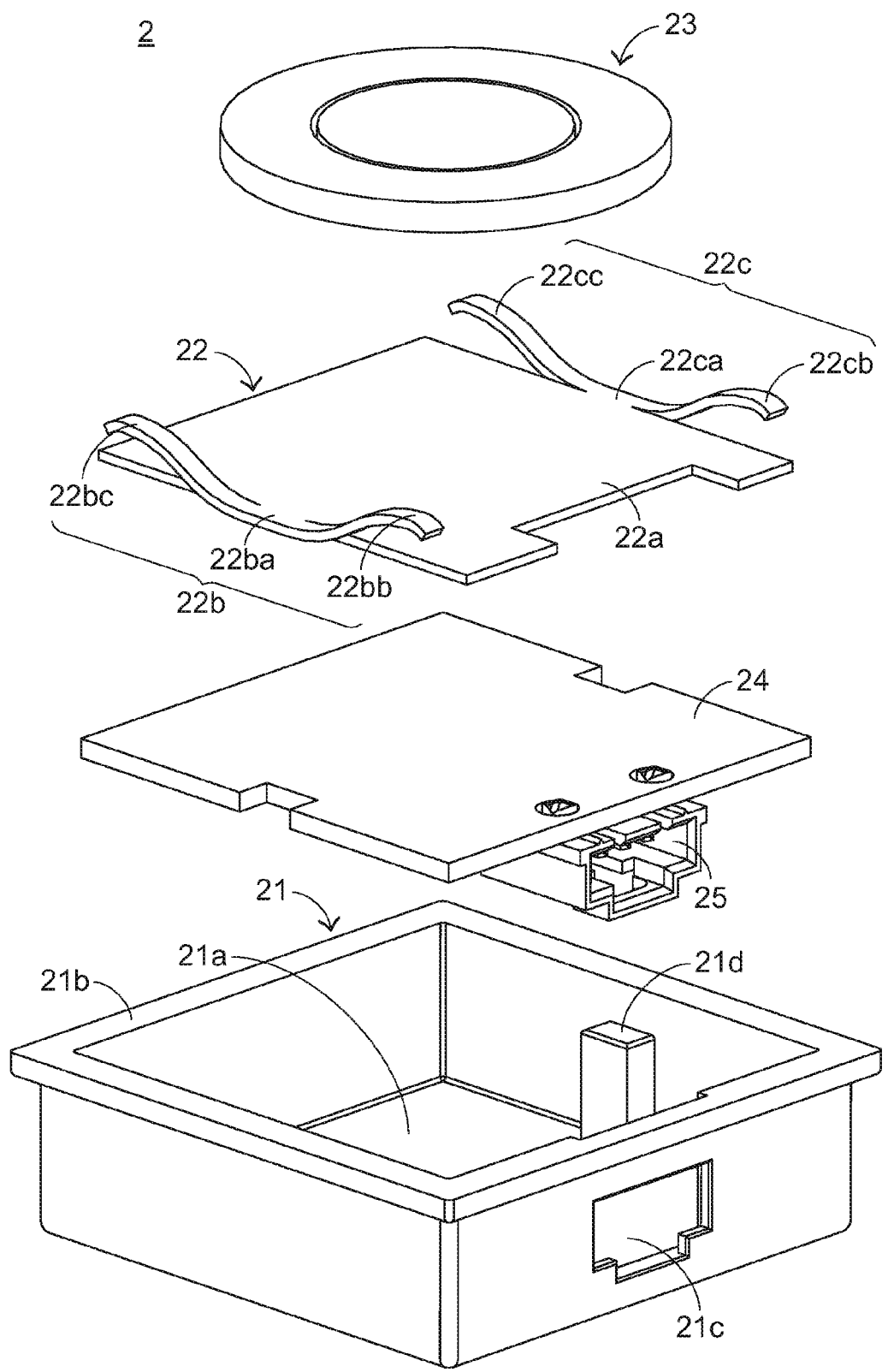
FIG. 4 is a schematic exploded view illustrating the wireless charging device of FIG. 3 and taken along a second viewpoint.

Hereinafter, the components of a wireless charging device according to an embodiment of the present invention will be illustrated with reference to FIGS. 3 and 4. FIG. 3 is a schematic exploded view illustrating a wireless charging device according to an embodiment of the present invention and taken along a first viewpoint. FIG. 4 is a schematic exploded view illustrating the wireless charging device of FIG. 3 and taken along a second viewpoint.

As shown in FIGS. 3 and 4, the wireless charging device 2 comprises a casing 21, a carrying member 22, a first coil assembly 23, a circuit board 24, and a connector 25. The casing 21 comprises a receiving space 21a, an entrance side 21b, a notch 21c, and a supporting part 21d. The supporting part 21d is disposed within the receiving space 21a. The carrying member 22 comprises a carrying plate 22a, a first elastic structure 22b, and a second elastic structure 22c. The first elastic structure 22b comprises a first connecting part 22ba, a first elastic piece 22bb, and a second elastic piece 22bc. The second elastic structure 22c comprises a second connecting part 22ca, a third elastic piece 22cb, and a fourth elastic piece 22cc.

The first connecting part 22ba of the first elastic structure 22b is extended from a first side of the carrying plate 22a. The first elastic piece 22bb is extended from a first end of the first connecting part 22ba. The second elastic piece 22bc is extended from a second end of the first connecting part 22ba.

The second connecting part 22ca of the second elastic structure 22c is extended from a second side of the carrying plate 22a. The third elastic piece 22cb is extended from a first end of the second connecting part 22ca. The fourth elastic piece 22cc is extended from a second end of the second connecting part 22ca.

In a preferred embodiment, the carrying member 22 is made of metallic material, so that the carrying member 22 has high supporting strength and the magnetic field generated by the first coil assembly 23 is enhanced.

Moreover, in this embodiment, the supporting part 21d comprises two posts, which are protruded from an inner surface of the receiving space 21a (see FIGS. 3 and 4).

Figure 5:
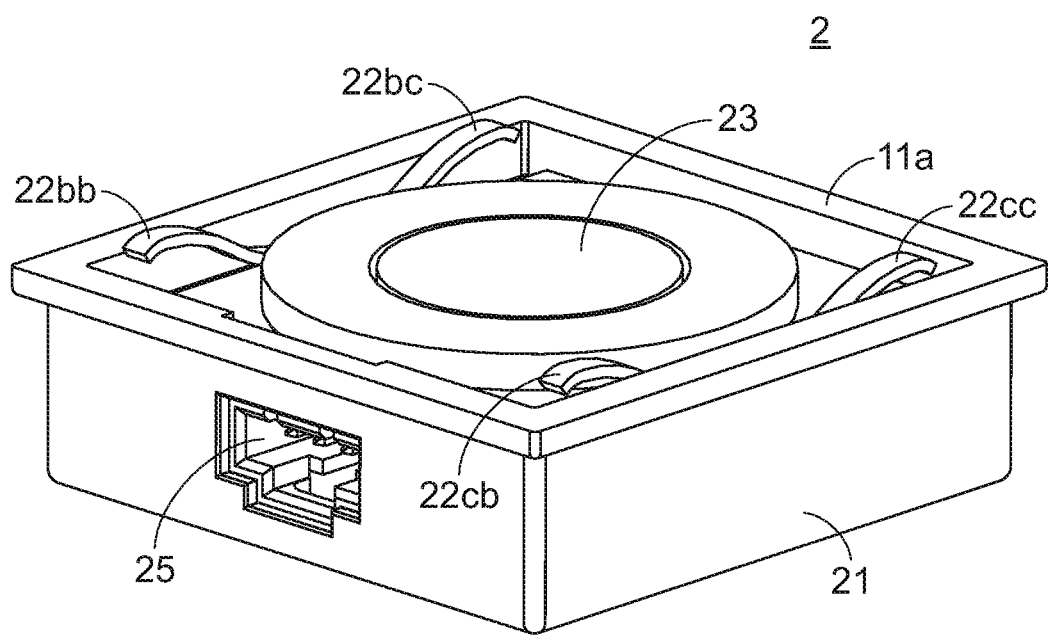
FIG. 5 is a schematic assembled view illustrating a wireless charging device according to an embodiment of the present invention.

FIG. 5 is a schematic assembled view illustrating a wireless charging device according to an embodiment of the present invention. Hereinafter, a sequence of assembling the wireless charging device will be illustrated with reference to FIGS. 3, 4 and 5.

Firstly, the first coil assembly 23 is fixed on a top surface of the carrying plate 22a, and the circuit board 24 is fixed on a bottom surface of the carrying plate 22a. Since the carrying member 22 is made of metallic material, the magnetic field generated by the first coil assembly 23 is hindered by the carrying plate 22a from adversely affecting the circuit board 24. In addition, the connector 25 is fixed on a bottom surface of the circuit board.

Next, the first coil assembly 23, the carrying member 22, the circuit board 24 and the connector 25 are all accommodated within the receiving space 21a. At this moment, the supporting part 21d is contacted with the first connecting part 22ba of the first elastic structure 22b and the second connecting part 22ca of the second elastic structure 22c in order to support the first coil assembly 23, the carrying member 22 and the circuit board 24. Moreover, the connector 25 is exposed to the notch 21c.

Moreover, as shown in FIG. 5, the distal ends of the first elastic piece 22bb, the second elastic piece 22bc, the third elastic piece 22cb and the fourth elastic piece 22cc are all protruded and exposed outside the receiving space 21a (see FIG. 5).

Figure 6:
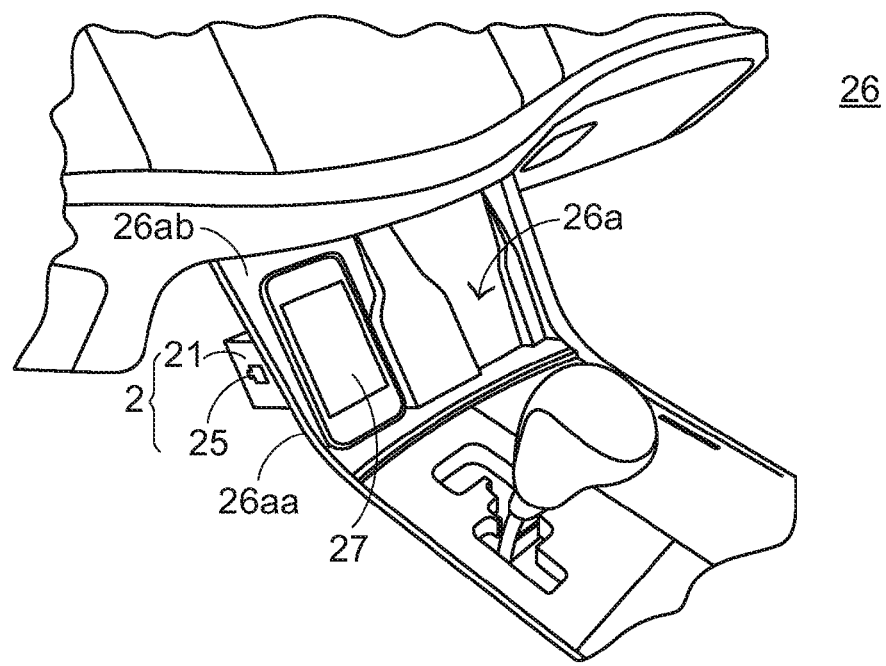
FIG. 6 schematically illustrates an application of the wireless charging device on a moving transport tool according to an embodiment of the present invention.
Figure 7:
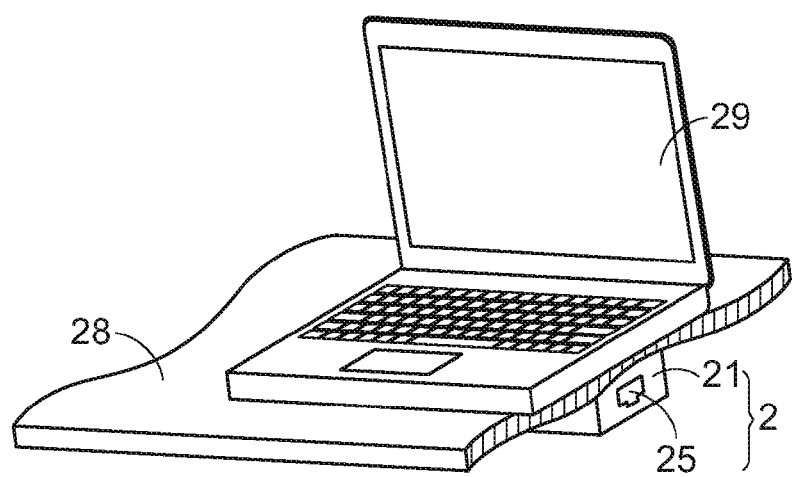
FIG. 7 schematically illustrates an application of the wireless charging device on a furniture product according to an embodiment of the present invention.

FIG. 6 schematically illustrates an application of the wireless charging device on a moving transport tool according to an embodiment of the present invention. FIG. 7 schematically illustrates an application of the wireless charging device on a furniture product according to an embodiment of the present invention. Hereinafter, the operations of the wireless charging device of the present invention will be illustrated with reference to FIGS. 5, 6 and 7.

The wireless charging device 2 of the present invention may be applied to a moving transport tool, a furniture product or any other place prone to vibration. In the following embodiments, the wireless charging device 2 is disposed within a vehicle or under a desk. It is noted that the wireless charging device 2 may be used in any other moving transport tool, any other furniture product, or any other object where an electronic apparatus may be placed.

As shown in FIG. 6, the wireless charging device 2 is disposed under a rack 26a of a vehicle 26. For installing the wireless charging device 2, the entrance side 21b of the casing 21 is fixed on a first surface 26aa of the rack 26a via an adhesive. In an embodiment, the adhesive is a 3M VHB double-sided tape or any other comparable material.

In a case that the user wants to use the wireless charging device 2, the connector 25 is firstly connected to a power source (not shown), and then an electronic apparatus 27 with a second coil assembly (not shown) is placed on a second surface 26ab of the rack 26a. Meanwhile, the wireless charging operation may be started.

In FIG. 6, the electronic apparatus 27 is illustrated by referring to a mobile phone. Nevertheless, the electronic apparatus 27 is not limited to the mobile phone. Another example of the electronic apparatus 27 includes but is not limited to a notebook computer or a digital camera.

In particular, the power source provides electric energy to the first coil assembly 23 through the circuit board 24, so that the first coil assembly 23 generates a magnetic field. When the second coil assembly (not shown) is located near the first coil assembly 23, the second coil assembly is influenced by the magnetic field, so that the second coil assembly generates an electric current to charge the electronic apparatus 27.

As mentioned above, the distal ends of the first elastic piece 22bb, the second elastic piece 22bc, the third elastic piece 22cb and the fourth elastic piece 22cc are all protruded and exposed outside the receiving space 21a. After the entrance side 21b of the casing 21 is connected with the first surface 26aa of the rack 26a, the supporting part 21d presses against the first connecting part 22ba of the first elastic structure 22b and the second connecting part 22ca of the second elastic structure 22c, allowing the first elastic piece 22bb, the second elastic piece 22bc, the third elastic piece 22cb and the fourth elastic piece 22cc to be pushed by the first surface 26aa of the rack 26a and subject to deformation. Consequently, a balanced supporting force is generated.

During the vehicle 26 is being driven by a user, the vibration energy from the vehicle body is absorbed by the first elastic structure 22b and the second elastic structure 22c. Since the wireless charging device 2 is not over-shaken, the possibility of damaging the wireless charging device 2 will be minimized. Moreover, due to the balanced supporting force generated by the first elastic structure 22b, the second elastic structure 22c and the supporting part 21d, a specified distance between the first coil assembly 23 and the first surface 26aa can be maintained. Furthermore, since a constant distance between the first coil assembly 23 and the second coil assembly (not shown) of the electronic apparatus 27 is maintained, the stable wireless charging performance is achieved.

As shown in FIG. 7, the wireless charging device 2 is attached on a bottom surface of a desk 28. After an electronic apparatus 29 with a second coil assembly (not shown) is placed on the desk 28, the wireless charging operation may be started. The installing way and operating principle of the wireless charging device 2 are similar to those of FIG. 6, and are not redundantly described herein.

In FIG. 7, the electronic apparatus 29 is illustrated by referring to a notebook computer. Nevertheless, the electronic apparatus 29 is not limited to the notebook computer. Another example of the electronic apparatus 29 includes but is not limited to a mobile phone or a digital camera.

From the above discussions, it is known that a constant distance between the first coil assembly 23 and the electronic apparatus can be maintained because of the first elastic structure 22b, the second elastic structure 22c and the supporting part 21d.

Moreover, since the vibration energy can be absorbed by the first elastic structure 22b and the second elastic structure 22c, the possibility of damaging the wireless charging device 2 will be minimized. Moreover, due to the balanced supporting force generated by the first elastic structure 22b, the second elastic structure 22c and the supporting part 21d, a specified distance between the first coil assembly 23 and the electronic apparatus can be maintained. Consequently, even if the wireless charging device 2 is applied to an object prone to vibration, the stable wireless charging performance can be achieved.

Moreover, due to the modularized design of the wireless charging device 2 of the present invention, the wireless charging device 2 can be operated by simply attaching the entrance side 21b of the casing 21 on the surface of the object via an adhesive. That is, the wireless charging device 2 of the present invention can be easily installed. Moreover especially, since the entrance side 21b of the casing 21 is sealed by the surface of the object, a closed space is defined within the casing 21. Under this circumstance, the wireless charging device 2 has dust-proof and waterproof efficacy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device, comprising:
   a casing comprising a receiving space, a supporting part, and an entrance side, wherein said supporting part is disposed within said receiving space;
   a carrying member disposed within said receiving space and located over said supporting part, wherein said carrying member comprises:
   a carrying plate;
   a first elastic structure located at a first side of said carrying plate, and comprising a first connecting part, a first elastic piece and a second elastic piece, wherein said first connecting part is extended from said first side of said carrying plate and contacted with said supporting part, said first elastic piece is extended from a first end of said first connecting part and has a distal end protruded outside said receiving space, and said second elastic piece is extended from a second end of said first connecting part and has a distal end protruded outside said receiving space; and
   a second elastic structure located at a second side of said carrying plate, and comprising a second connecting part, a third elastic piece and a fourth elastic piece, wherein said second connecting part is extended from said second side of said carrying plate and contacted with said supporting part, said third elastic piece is extended from a first end of said second connecting part and has a distal end protruded outside said receiving space, said fourth elastic piece is extended from a second end of said third elastic piece and has a distal end protruded outside said receiving space;

a first coil assembly fixed on a top surface of said carrying plate, wherein when said entrance side of said casing is fixed on a first surface of an object, said supporting part presses against said first connecting part of said first elastic structure and said second connecting part of said second elastic structure, allowing said first elastic piece, said second elastic piece, said third elastic piece and said fourth elastic piece to be pushed by said first surface of said object and subject to deformation, so that a balanced supporting force is generated to maintain a specified distance between said first coil assembly and said first surface of said object.

2. The wireless charging device according to claim 1, wherein when an electronic apparatus with a second coil assembly is placed on a second surface of said object, said electronic apparatus is charged by said second coil assembly.

3. The wireless charging device according to claim 2, further comprising a circuit board, wherein said circuit board is fixed on a bottom surface of said carrying plate.

4. The wireless charging device according to claim 3, further comprising a connector, wherein said connector is fixed on said circuit board.

5. The wireless charging device according to claim 4, wherein said casing further comprises a notch, and said connector is exposed to said notch to be connected with a power source.

6. The wireless charging device according to claim 5, wherein said power source provides electric energy to said first coil assembly through said circuit board, so that said first coil assembly generates a magnetic field.

7. The wireless charging device according to claim 6, wherein said second coil assembly is influenced by said magnetic field, so that said second coil assembly generates an electric current.

8. The wireless charging device according to claim 1, wherein said supporting part comprises two posts, which are protruded from an inner surface of said receiving space.

9. The wireless charging device according to claim 1, wherein said object is a moving transport tool or a furniture product.

10. The wireless charging device according to claim 1, wherein said carrying member is made of metallic material.

\* \* \* \* \*